(12) United States Patent
Khan et al.

(10) Patent No.: US 12,129,314 B1
(45) Date of Patent: Oct. 29, 2024

(54) ULTRASOUND-ASSISTED METHOD FOR HIGH-YIELD CELLULOSE EXTRACTION FROM RAW RICE STRAW WITHOUT THE NEED FOR BLEACHING STEP

(71) Applicant: KING FAISAL UNIVERSITY, Al-Ahsa (SA)

(72) Inventors: Gausal Azam Khan, Al Ahsa (SA); Sankha Chakraborty, Odisha (IN); Suraj K. Tripathy, Odisha (IN); Shirsendu Banerjee, Odisha (IN)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/429,102

(22) Filed: Jan. 31, 2024

(51) Int. Cl.
*C08B 15/00* (2006.01)

(52) U.S. Cl.
CPC .................... *C08B 15/00* (2013.01)

(58) Field of Classification Search
CPC .................. C08B 15/00; C08B 15/02
See application file for complete search history.

(56) References Cited

U.S. PATENT DOCUMENTS

| 10,968,283 B2 | 4/2021 | Andrews et al. |
| 2011/0061825 A1 | 3/2011 | Li et al. |
| 2016/0289893 A1 | 10/2016 | Martin et al. |

FOREIGN PATENT DOCUMENTS

| CN | 115010827 A | 9/2022 |
| WO | 2013000074 A1 | 1/2013 |

OTHER PUBLICATIONS

Entry for chloromethylene, NIST Chemistry WebBook, https://webbook.nist.gov, accessed online on May 16, 2024. (Year: 2024).*
Hou et al., Bioresource Technology, 2018, 249, p. 261-267. (Year: 2018).*
Ratnakumar et al., Materials Today: Proceedings, 2021, 45, p. 5714-5719. (Year: 2021).*
Rodsamran et al., International Journal of Food Science and Technology, 2015, 50, p. 1953-1959. (Year: 2015).*
Wathsala et al., 2021 Moratuwa Engineering Research Conference (MERCon), Moratuwa, Sri Lanka, 2021, p. 670-675. (Year: 2021).*
Freitas et al., Innovative Food Science and Emerging Technologies, 2002, 76, article 102932, 14 pages. (Year: 2002).*
Nasri-Nasrabadi et al., J. Appl. Polym. Sci., 2014, 131, article 40063, 7 pages. (Year: 2014).*
Sirvio et al., J. Mater. Chem. A, 2017, 5, p. 21828-21835. (Year: 2017).*
Vu et al., "Lignin and Cellulose Extraction From Vietnam's Rice Straw Using Ultrasound-Assisted Alkaline Treatment Method", International Journal of Polymer Science, vol. 2017, pp. 1-8, First available online on Oct. 25, 2017.
Sirvio et al., "Anionic Wood Nanofibers Produced From Unbleached Mechanical Pulp By Highly Efficient Chemical Modification", Journal of Materials Chemistry A, 2017, 5, pp. 21828-21835, First available online on Oct. 24, 2017.

* cited by examiner

*Primary Examiner* — Jonathan S Lau
(74) *Attorney, Agent, or Firm* — Nath, Goldberg & Meyer; Joshua B. Goldberg

(57) ABSTRACT

A method of making microcrystalline grade powdered cellulose from rice straw can include obtaining rice straws; drying the rice straws to obtain dried rice straws; cutting the dried rice straws to obtain rice straw pieces; soaking the rice straw pieces in a solvent to obtain a mixture; adding the mixture to an acidic solution to obtain a solution mixture; ultrasonicating the solution mixture to obtain extracted cellulose; separating the extracted cellulose from the solution mixture via filtering to obtain filtered extracted cellulose; adding the filtered extracted cellulose to a solution of sodium hydroxide to obtain a mercerized mixture; stirring while heating the mercerized mixture to obtain mercerized cellulose; separating the mercerized cellulose from the mercerized mixture via filtering to obtain filtered mercerized cellulose; and drying the filtered mercerized cellulose to obtain microcrystalline grade powdered cellulose.

14 Claims, 4 Drawing Sheets

ULTRASOUND-ASSISTED METHOD FOR HIGH-YIELD CELLULOSE EXTRACTION FROM RAW RICE STRAW WITHOUT THE NEED FOR BLEACHING STEP

FIELD AND BACKGROUND

The disclosure of the present application relates to a method of making microcrystalline grade powdered cellulose from rice straw.

DESCRIPTION OF THE PRIOR ART

Rice has been widely cultivated in many parts of the world, predominantly in Asian countries such as Vietnam, China, India, Indonesia, Bangladesh, Thailand, Myanmar, Philippines, and Japan. Rice straw is one of the byproducts produced as a result of rice production during harvest. It is estimated that more than 950 million tons of rice straw is annually available worldwide. A significant portion of the rice straw is used as cattle feed, animal bedding, organic fertilizer, and wrapping materials during transport. However, a substantial amount of rice straw is burned in agricultural fields leading to environmental problems such as air pollution and greenhouse gas emissions. Due to higher costs in handling rice straw relative to their value and limited time to prepare the fields for the next crop, many farmers, especially in Asian countries, prefer to burn the stubble fields.

Rice straw contains about 32% to 47% cellulose, about 19% to 32% hemicellulose, about 5% to 24% lignin, and about 13% to 20% other components. Due to the high content of cellulose in rice straw, its being renewable annually, its abundance, and being a cheap source for natural cellulose fibers, there has been growing interests in utilizing rice straw for many different applications to minimize environmental impacts. Some of these applications are in the fields of pharmaceutical, cosmetic, biomedical, food, energy, biofuel, pulp and paper production, composite materials, and construction materials.

In order to be usable for the many different applications, cellulose from rice straw must be efficiently extracted and isolated. There are many conventional extraction methods such as hydrothermal, acidic, wet oxidation, ammonia fiber explosion, organosolv, and ionic liquid pretreatment. Despite some of the advantages of these conventional extraction methods, they are typically expensive to operate and energy intensive.

In light of the above, a need remains for an environmental-friendly, low-energy intensive, and efficient method of extracting cellulose from rice straw.

SUMMARY

The present subject matter relates to a method of making microcrystalline grade powdered cellulose from rice straw.

In one embodiment, the method of making microcrystalline grade powdered cellulose from rice straw includes obtaining rice straws; drying the rice straws to obtain dried rice straws; cutting the dried rice straws to obtain rice straw pieces; soaking the rice straw pieces in a solvent to obtain a mixture; adding the mixture to an acidic solution to obtain a solution mixture; ultrasonicating the solution mixture to obtain extracted cellulose; separating the extracted cellulose from the solution mixture via filtering to obtain filtered extracted cellulose; adding the filtered extracted cellulose to a solution of sodium hydroxide to obtain a mercerized mixture; stirring while heating the mercerized mixture to obtain mercerized cellulose; separating the mercerized cellulose from the mercerized mixture via filtering to obtain filtered mercerized cellulose; and drying the filtered mercerized cellulose to obtain microcrystalline grade powdered cellulose.

In an embodiment, the rice straws can be washed with distilled water prior to the drying step.

In an embodiment, the rice straws can be dried at about 60° C. in a hot air oven.

In another embodiment, the rice straw pieces can be prepared by cutting the dried rice straws into various sizes in a range from about 0.4 cm to about 1 cm.

In another embodiment, the mixture can be prepared by soaking the rice straw pieces in a deep eutectic solvent (DES) for about 2 hours at a ratio of the rice straw pieces to the deep eutectic solvent of about 1:10, w/w.

In a further embodiment, the deep eutectic solvent can include lactic acid.

In an embodiment, the solution mixture can be prepared by adding the mixture to about 2M acidic solution of sulphuric acid.

In an embodiment, the extracted cellulose can be prepared by ultrasonicating the solution mixture at about 80° C.±about 50° C. for about 2 hours at about 400 rpm.

In another embodiment, the filtered extracted cellulose can be washed with water until a pH of the filtered extracted cellulose is neutral.

In another embodiment, the mercerized mixture can be prepared by adding the filtered extracted cellulose to about 2M solution of sodium hydroxide.

In another embodiment, the mercerized cellulose can be prepared by stirring the mercerized mixture with a magnetic stirrer at about 80° C. for about 2 hours at about 400 rpm.

In another embodiment, the filtered mercerized cellulose can be washed with water until a pH of the filtered mercerized cellulose is neutral.

In an embodiment, the microcrystalline grade powdered cellulose can be prepared by drying the filtered mercerized cellulose in a hot air oven at about 60° C. to about 70° C. for about 6 hours to about 7 hours.

In an embodiment, the method above can produce about 160 g of microcrystalline grade powdered cellulose from about 400 g of rice straw.

In a further embodiment, the present subject matter relates to a microcrystalline grade powdered cellulose from rice straw made by the above method.

These and other features of the present subject matter will become readily apparent upon further review of the following specification.

DETAILED DESCRIPTION

Figure 1:
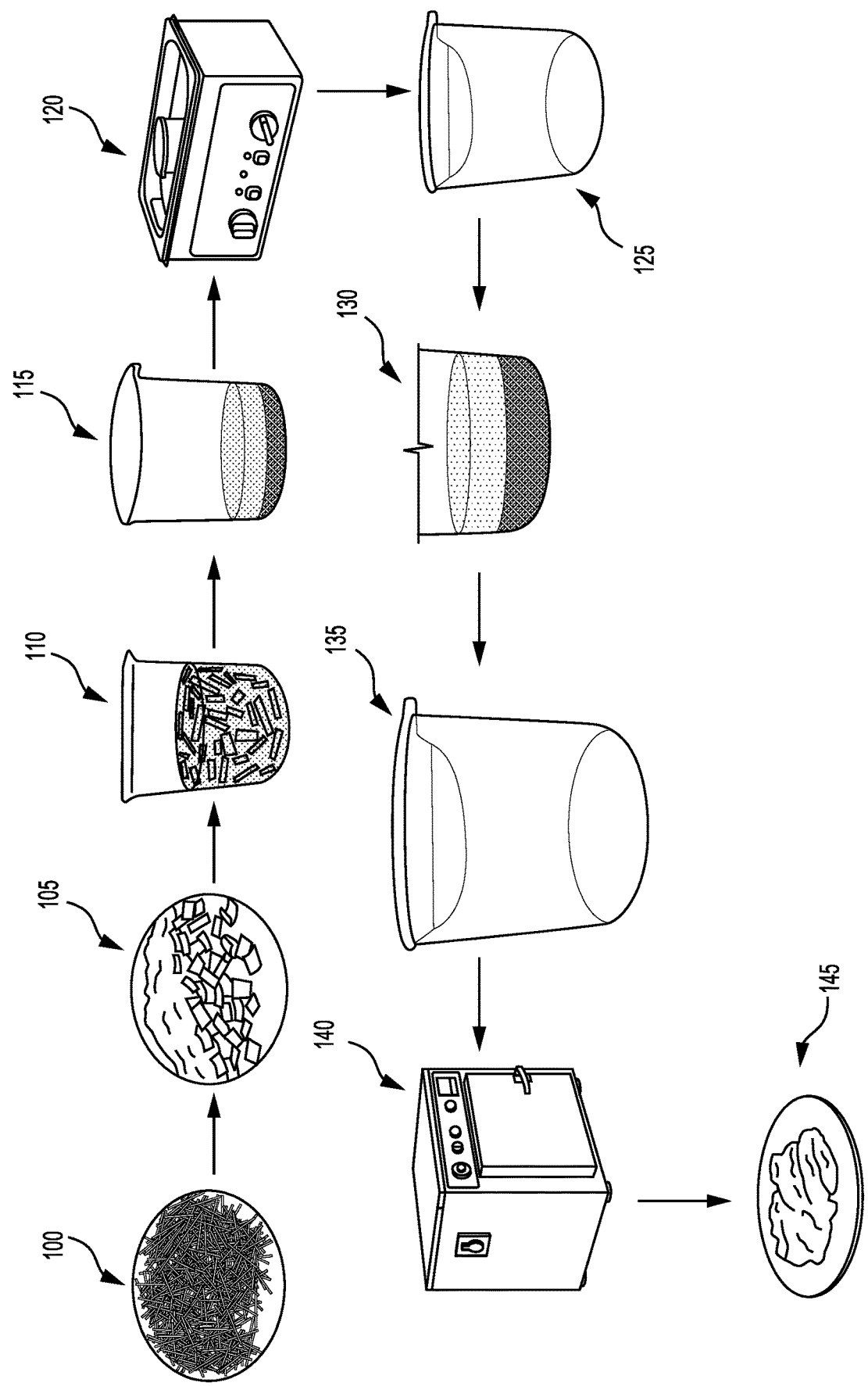
FIG. 1 depicts the overall process for making microcrystalline grade powdered cellulose from rice straw.

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of making microcrystalline grade powdered cellulose from rice straw.

FIG. 1 depicts, in one embodiment, a method of making microcrystalline grade powdered cellulose from rice straw which includes obtaining rice straws in step (100); drying the rice straws to obtain dried rice straws (not shown); cutting the dried rice straws to obtain rice straw pieces in step (105); soaking the rice straw pieces in a solvent to obtain a mixture in step (110); adding the mixture to an acidic solution to obtain a solution mixture in step (115); ultrasonicating the solution mixture to obtain extracted cellulose in step (120); separating the extracted cellulose from the solution mixture via filtering to obtain filtered extracted cellulose in step (125); adding the filtered extracted cellulose to a solution of sodium hydroxide to obtain a mercerized mixture in step (130); stirring while heating the mercerized mixture to obtain mercerized cellulose in step (130); separating the mercerized cellulose from the mercerized mixture via filtering to obtain filtered mercerized cellulose in step (135); and drying the filtered mercerized cellulose in step (140) to obtain microcrystalline grade powdered cellulose in step (145).

In a further embodiment, the present subject matter relates to a microcrystalline grade powdered cellulose from rice straw made by the above method.

In an embodiment, the method can include obtaining about 400 g of rice straws and washing the rice straws with distilled water. The washed rice straws can be dried at about 60° C. in a hot air oven to obtain dried rice straws. The dried rice straws can be cut to a predetermined size to obtain rice straw pieces. In a non-limiting embodiment, the predetermined size can be in a range from about 0.4 cm to about 1 cm.

In an embodiment, the rice straw pieces can be soaked in a deep eutectic solvent (DES) for about 2 hours at a ratio of the rice straw pieces to the deep eutectic solvent of about 1:10, w/w to obtain a mixture. The deep eutectic solvent can include lactic acid. Other deep eutectic solvents may be used in alternative embodiments.

In an embodiment, the obtained mixture can be added to about 2M acidic solution of sulphuric acid to obtain a solution mixture.

In an embodiment, the solution mixture can be ultrasonicated at about 80° C.±about 50° C. for about 2 hours at about 400 rpm to obtain extracted cellulose. Afterward, the extracted cellulose can be separated from the solution mixture via filtering to obtain filtered extracted cellulose. Then, the filtered extracted cellulose can be washed with water until a pH of the filtered extracted cellulose was neutral as shown in step (125).

In an embodiment, the washed filtered extracted cellulose can be added to about 2M solution of sodium hydroxide to obtain a mercerized mixture. The mercerized mixture can be stirred with a magnetic stirrer at about 80° C. for about 2 hours at about 400 rpm to obtain mercerized cellulose. Afterward, the mercerized cellulose can be separated from the mercerized mixture via filtering to obtain filtered mercerized cellulose. Then, the filtered mercerized cellulose can be washed with water until a pH of the filtered mercerized cellulose was neutral as shown in step (135).

In an embodiment, the washed filtered mercerized cellulose can be dried in a hot air oven at about 60° C. to about 70° C. for about 6 hours to about 7 hours to obtain 160 g of microcrystalline grade powdered cellulose.

The following examples illustrate the present teachings.

EXAMPLES

Example 1

Preparation of Microcrystalline Grade Powdered Cellulose

The process of making microcrystalline grade powdered cellulose from rice straw was conducted using the following steps.

Collection of the rice straws: About 400 g of rice straws were collected and washed with distilled water. The rice straws were locally sourced.

Drying of the rice straw: The washed rice straws were dried at about 60° C. in a hot air oven to obtain dried rice straws.

Cutting the dried rice straws: The dried rice straws were cut to a predetermined size to obtain rice straw pieces.

Soaking: The rice straw pieces were soaked in a deep eutectic solvent (DES) for about 2 hours at a ratio of the rice straw pieces to the deep eutectic solvent of about 1:10, w/w to obtain a mixture. The deep eutectic solvent includes lactic acid.

Acid hydrolysis: The obtained mixture was added to about 2M acidic solution of sulphuric acid to obtain a solution mixture.

Ultrasonication: The solution mixture was ultrasonicated at about 80° C.±about 50° C. for about 2 hours at about 400 rpm to obtain extracted cellulose.

First filtering: The extracted cellulose was separated from the solution mixture via filtering to obtain filtered extracted cellulose.

First washing: The filtered extracted cellulose was washed with water until a pH of the filtered extracted cellulose was neutral.

Alkaline treatment: The washed filtered extracted cellulose was added to about 2M solution of sodium hydroxide to obtain a mercerized mixture.

Stirring: The mercerized mixture was stirred with a magnetic stirrer at about 80° C. for about 2 hours at about 400 rpm to obtain mercerized cellulose.

Second filtering: The mercerized cellulose was separated from the mercerized mixture via filtering to obtain filtered mercerized cellulose.

Second washing: The filtered mercerized cellulose was washed with water until a pH of the filtered mercerized cellulose was neutral.

Drying: The washed filtered mercerized cellulose was dried in a hot air oven at about 60° C. to about 70° C. for about 6 hours to about 7 hours to obtain 160 g of microcrystalline grade powdered cellulose.

The obtained microcrystalline grade powdered cellulose was produced using one of the following predetermined cut sizes for the dried rice straws: about 0.4 cm, about 0.6 cm, about 0.8 cm, or about 1 cm. The above process was repeated for the rest of the mentioned predetermined cut sizes to produce a plurality of microcrystalline grade powdered celluloses from four different predetermined cut sizes for the dried rice straws.

Figure 2:
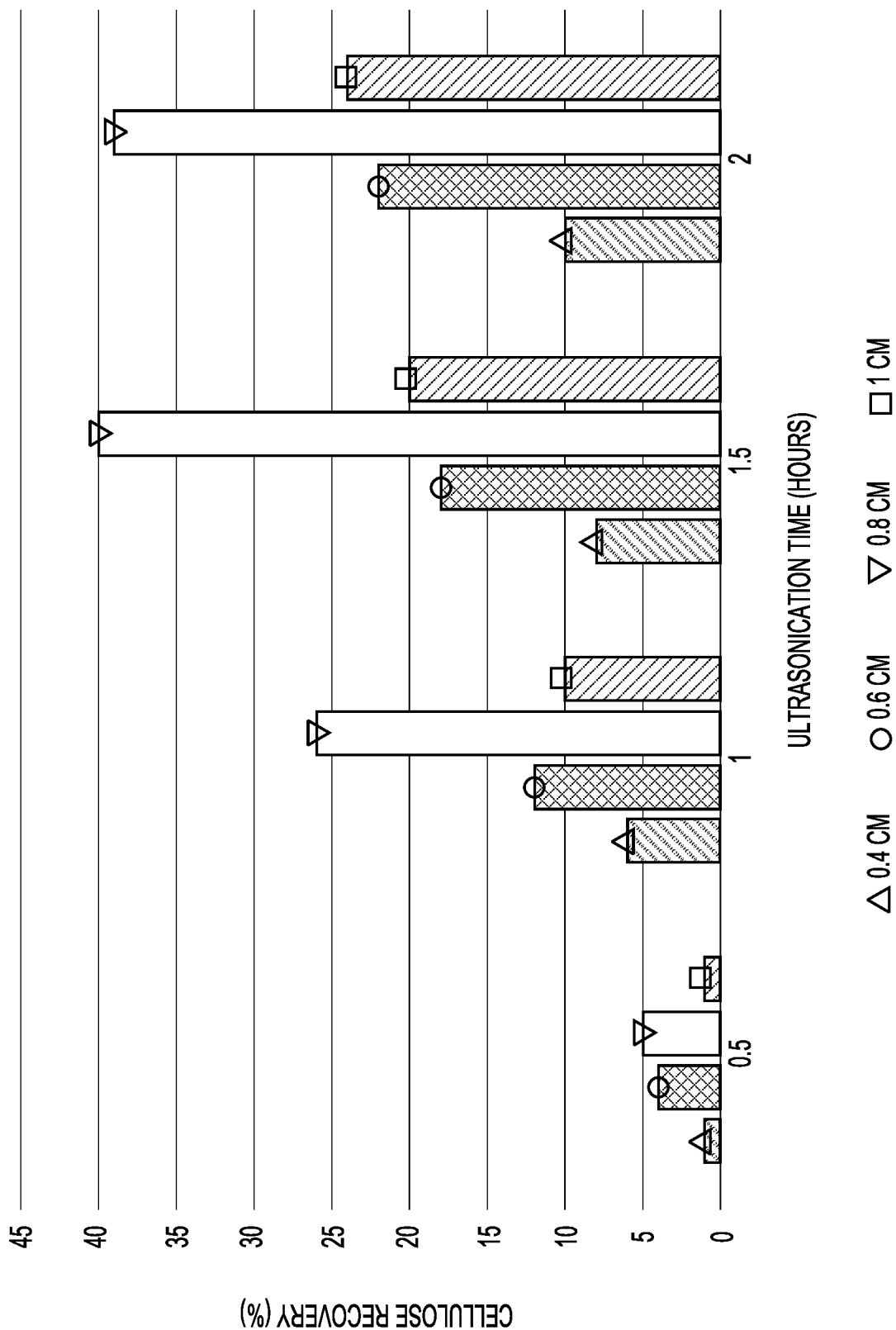
FIG. 2 depicts the effects of ultrasonication times and rice straw sizes on cellulose recovery rates.

As shown in FIG. 2, about 40% maximum recovery of cellulose from the rice straws was achieved at about 1.5 hours of ultrasonication with rice straw pieces having a size of about 0.8 cm.

Example 2

UV Peak of Synthesized Cellulose

Figure 3:
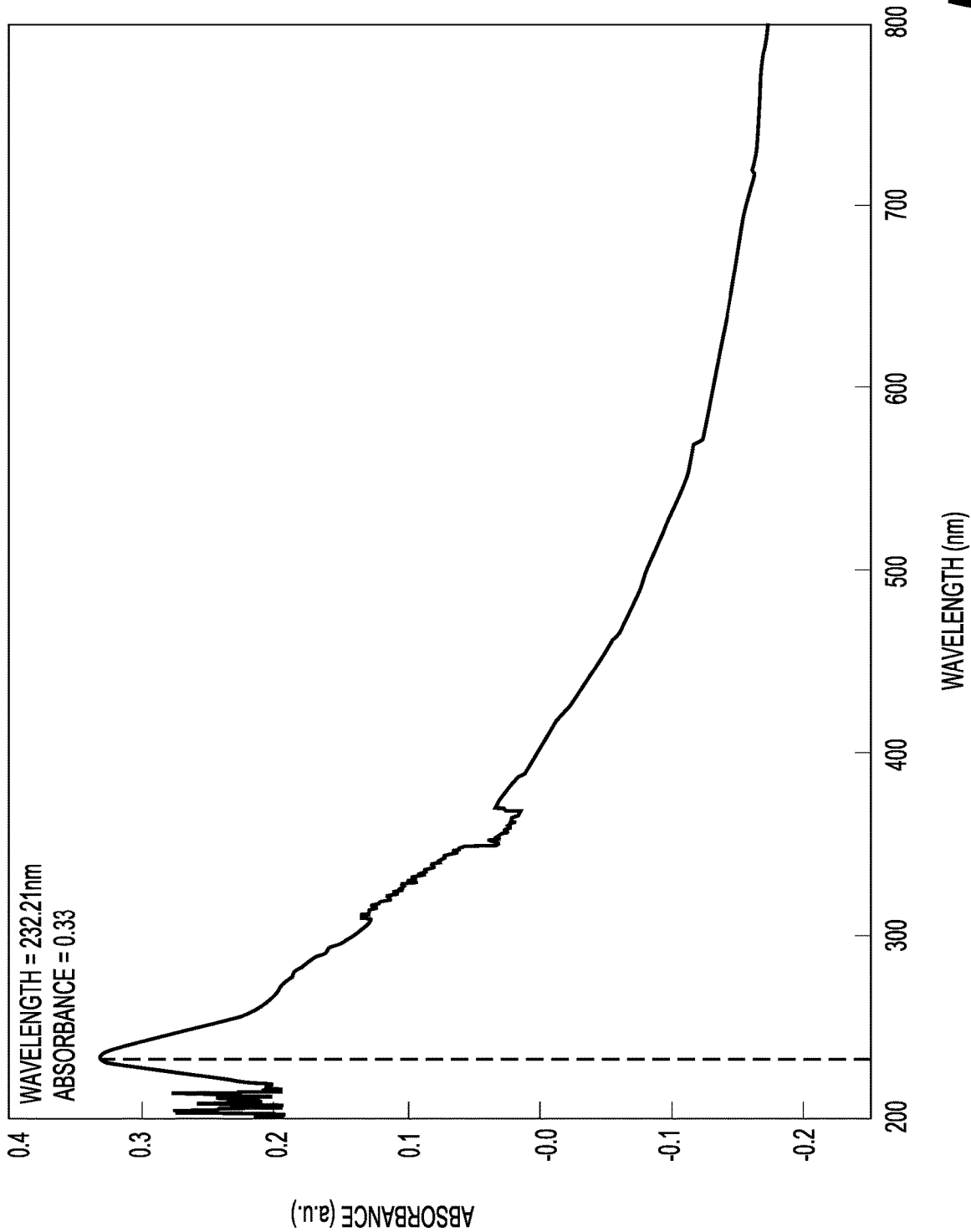
FIG. 3 depicts UV peak of synthesized cellulose.

FIG. 3 shows UV peak of the synthesized cellulose, prepared by the process above (see acid hydrolysis step), resulting in a wavelength of about 232.21 nm with an absorbance value of about 0.33.

Example 3

XRD Analysis of Synthesized Cellulose

Figure 4:
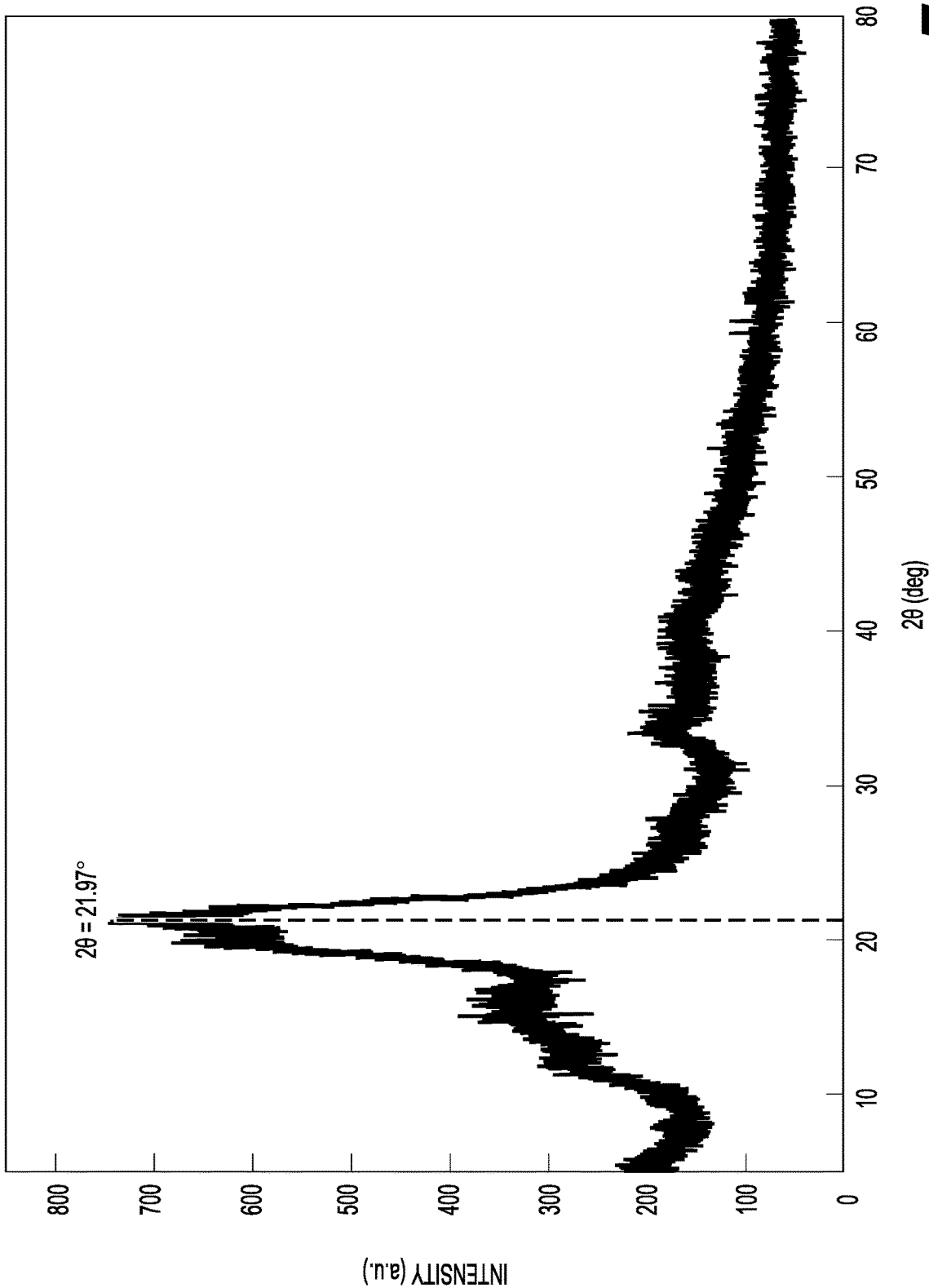
FIG. 4 depicts X-ray diffraction analysis (XRD) of synthesized cellulose.

FIG. 4 shows X-ray diffraction analysis (XRD) of the synthesized cellulose, prepared by the process above (see acid hydrolysis step), resulting in a diffraction peak at about 21.97° (2θ). The XRD is a useful tool to check whether the synthesized cellulose is a crystalline or amorphous material.

It is to be understood that the method of making microcrystalline grade powdered cellulose from rice straw is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making microcrystalline grade powdered cellulose from rice straw, the method comprising:
   obtaining rice straws;
   drying the rice straws to obtain dried rice straws;
   cutting the dried rice straws to obtain rice straw pieces;
   soaking the rice straw pieces in a solvent to obtain a mixture;
   adding the mixture to an acidic solution to obtain a solution mixture;
   ultrasonicating the solution mixture to obtain extracted cellulose;
   separating the extracted cellulose from the solution mixture via filtering to obtain filtered extracted cellulose;
   adding the filtered extracted cellulose to a solution of sodium hydroxide to obtain a mercerized mixture;
   stirring while heating the mercerized mixture to obtain mercerized cellulose;
   separating the mercerized cellulose from the mercerized mixture via filtering to obtain filtered mercerized cellulose; and
   drying the filtered mercerized cellulose to obtain microcrystalline grade powdered cellulose.

2. The method of making microcrystalline grade powdered cellulose from rice straw of claim 1, wherein the rice straws are washed with distilled water prior to the drying step.

3. The method of making microcrystalline grade powdered cellulose from rice straw of claim 1, wherein the rice straws are dried at about 60° C. in a hot air oven.

4. The method of making microcrystalline grade powdered cellulose from rice straw of claim 1, wherein the rice straw pieces are prepared by cutting the dried rice straws into various sizes in a range from about 0.4 cm to about 1 cm.

5. The method of making microcrystalline grade powdered cellulose from rice straw of claim 1, wherein the mixture is prepared by soaking the rice straw pieces in a deep eutectic solvent (DES) for about 2 hours at a ratio of the rice straw pieces to the deep eutectic solvent of about 1:10, w/w.

6. The method of making microcrystalline grade powdered cellulose from rice straw of claim 5, wherein the deep eutectic solvent comprises lactic acid.

7. The method of making microcrystalline grade powdered cellulose from rice straw of claim 1, wherein the solution mixture is prepared by adding the mixture to about 2M acidic solution of sulphuric acid.

8. The method of making microcrystalline grade powdered cellulose from rice straw of claim 1, wherein the extracted cellulose is prepared by ultrasonicating the solution mixture at about 80° C.±about 50° C. for about 2 hours at about 400 rpm.

9. The method of making microcrystalline grade powdered cellulose from rice straw of claim 1, wherein the filtered extracted cellulose is washed with water until a pH of the filtered extracted cellulose is neutral.

10. The method of making microcrystalline grade powdered cellulose from rice straw of claim 1, wherein the mercerized mixture is prepared by adding the filtered extracted cellulose to about 2M solution of sodium hydroxide.

11. The method of making microcrystalline grade powdered cellulose from rice straw of claim 1, wherein the mercerized cellulose is prepared by stirring the mercerized mixture with a magnetic stirrer at about 80° C. for about 2 hours at about 400 rpm.

12. The method of making microcrystalline grade powdered cellulose from rice straw of claim 1, wherein the filtered mercerized cellulose is washed with water until a pH of the filtered mercerized cellulose is neutral.

13. The method of making microcrystalline grade powdered cellulose from rice straw of claim 1, wherein the microcrystalline grade powdered cellulose is prepared by drying the filtered mercerized cellulose in a hot air oven at about 60° C. to about 70° C. for about 6 hours to about 7 hours.

14. The method of making microcrystalline grade powdered cellulose from rice straw of claim 1, wherein the method produces about 160 g of microcrystalline grade powdered cellulose from about 400 g of rice straw.

* * * * *